United States Patent [19]
Bracco et al.

[11] 4,333,959
[45] Jun. 8, 1982

[54] DECHOLESTERIZATION OF EGG-YOLK

[75] Inventors: Umberto Bracco; Jean-Louis Viret, both of La Tour-de-Peilz, Switzerland

[73] Assignee: Societe d'Assistance Technique pour Produits Nestle S.A., Lausanne, Switzerland

[21] Appl. No.: 190,975

[22] Filed: Sep. 26, 1980

[51] Int. Cl.³ ............................................... A23L 1/32
[52] U.S. Cl. .................................... 426/614; 426/384; 426/429; 426/490
[58] Field of Search ............... 426/614, 429, 480, 417, 426/384, 490

[56] References Cited

U.S. PATENT DOCUMENTS

| 1,277,727 | 9/1918 | Hussey | 426/417 |
| 3,563,765 | 2/1971 | Melnick | 426/429 X |
| 3,717,474 | 2/1973 | Fioriti et al. | 426/429 X |
| 3,881,034 | 4/1975 | Levin | 426/429 X |
| 4,234,619 | 11/1980 | Yano et al. | 426/614 |

FOREIGN PATENT DOCUMENTS 46-42186 12/1971 Japan .

Primary Examiner—Robert A. Yoncoskie
Attorney, Agent, or Firm—Vogt & O'Donnell

[57] ABSTRACT

A process of reducing the amount of cholesterol in egg-yolk which comprises reducing the pH of fresh wet egg-yolk to destabilize the emulsion, treating the destabilized emulsion with an edible oil to form a fine dispersion and centrifuging the dispersion to separate the egg-yolk phase from the oil-phase.

13 Claims, No Drawings

DECHOLESTERIZATION OF EGG-YOLK

The present invention relates to a process for reducing the amount of cholesterol in egg-yolk.

Physicians and health organizations currently agree that the lipid phase of a diet should provide an optimal balance between polyunsaturated and saturated fats. There has been shown to be a correlation between heart and circulatory diseases and diets containing higher amounts of cholesterol and saturated fats. It is therefore desirable to reduce whenever possible the amount of cholesterol in foods and in raw materials which are used in food production.

Egg-yolk has a large application in foods and as it is an efficient emulsifying agent it is an essential ingredient in mayonnaises, cake batters containing fats, cream puffs, bakery goods and candies.

Egg yolk contains a high level of cholesterol and saturated fats and is itself an emulsion comprising a dispersion of oil droplets in a continuous phase of aqueous components. It has a total solid content of approximately 50 to 52% composed of 15.5 to 16.5% protein, 31.5 to 34.5% lipid, 0.5 to 1.5% carbohydrate and 0.9 to 1.2% ash.

The egg-yolk lipids comprise as their main components approximately 65% triglyceride, 29% phospholipid and 5% cholesterol. The high amount of self emulsifying phospholipids, wherein the highest hydrophilic component is phosphatidylcholine representing 75% of the total, makes egg yolk a very stable emulsion in addition to being an emulsifying agent.

The main features of the organoleptic properties of egg-yolks are the flavour and the colour, the latter being due to naturally occurring pigments which are mainly alcohol soluble xanthophylls.

Many attempts have been made to reduce the cholesterol and fat content of egg-yolk while retaining the functionality, appearance and taste of natural eggs.

For example, U.S. Pat. No. 3,717,474 describes a process of mixing egg-yolk, in which the natural water content has been substantially retained, with an edible oil for a time and with a shearing energy sufficient to transfer cholesterol from the yolk to the oil, and gravitationally separating the yolk from the oil to recover said yolk.

Japanese Pat. No. 7,142,186 describes a method for reducing the lipid of an egg-yolk by adding 0.5 to 2 parts lower monoalcohol and a small amount of an acid to egg-yolk until pH is 3-6, adding water to the mixture while being stirred, and then treating the mixture by centrifuge.

We have found that by reducing the pH of an egg-yolk before treating it with an edible oil to form a fine dispersion and then centrifuging we can extract more cholesterol than in a similar process but in which the pH is not reduced while at the same time avoiding the use of organic solvents. In our improved process, the aforementioned desirable emulsifying properties, and the specific organoleptic properties of colour and flavour which make egg-yolk a desirable ingredient in foods, are retained.

According to the present invention there is provided a process of reducing the amount of cholesterol in egg-yolk characterised in that the pH of fresh wet egg-yolk is reduced to destabilise the emulsion, the destabilised emulsion is treated with an edible oil to form a fine dispersion which is then centrifuged to separate the egg-yolk phase from the oil-phase.

Reduction of the pH not only destabilises the emulsion but also reduces the viscosity and during the treatment with the edible oil a large amount of cholesterol is transferred into the oil. After centrifugation the mixture forms two phases, an upper oil phase and a lower egg-yolk phase which can easily be separated by conventional means.

The pH of egg-yolk is normally about 6.68 and preferably it is reduced to a value not below 3 and most preferably from 4 to 6. The pH may be reduced by adding an acid, preferably a strong mineral acid such as hydrochloric or phosphoric acid. The amount of acid added to the egg-yolk may conveniently be from 0.05% to 0.5% by weight based on the weight of egg-yolk. The concentration of the acid used depends inversely on its strength but a mineral acid may be used in a concentration of from 10% to 20%, and preferably from 15% to 18%.

The viscosity of egg-yolk measured on a Brookfield viscometer using spindle No. 2 rotating at 50 rpm is normally in the range of from 180 to 300 cp at 20° C. and the reduction of the pH also results in a reduction in the viscosity to a range of from 100 to 190 cp at 20° C. thus allowing the efficient centrifugation and cholesterol transfer into the oil phase from the fluidised egg yolk mass.

The edible oil used may be any edible digestible oil substantially free of cholesterol and one that is normally liquid or partially liquid at room temperature. It may be a polyunsaturated oil, a partially hydrogenated oil or an oil in which the balance of polyunsaturated to saturated components has been adjusted according to the requirements. Conveniently the oil contains at least 50%, preferably at least 75% polyunsaturated component. Examples of suitable polyunsaturated vegetable seed oils are corn oil, cottonseed oil, soybean oil, sesame seed oil, sunflower seed oil, safflower oil, rice bran oil, grapeseed oil, pumpkin oil or peanut oil. Oils with a high polyunsaturated content, in addition to removing cholesterol, produce an egg-yolk with an increased polyunsaturated fat content. Conveniently, cholesterol-containing edible oil that has been separated from the egg-yolk may be treated to remove cholesterol and other lipid material solubilised during the process for example, by molecular distillation and this treated oil may be reused to reduce the amount of cholesterol in egg-yolk.

The destabilised emulsion is conveniently treated with a quantity of edible oil sufficient for the blend to have a free-flowing state but not in such quantity that the after-treatment of the oil is uneconomical. Preferably the destabilised emulsion is treated with from 2 to 10 times and especially from 3 to 5 times its own weight of edible oil.

The particle size of the fine dispersion of the destabilised egg-yolk emulsion produced by treatment with the edible oil may be from 1 to 20µ and preferably from 5 to 10µ. The fine dispersion of the destabilised egg-yolk and edible oil may be formed by homogenisation conveniently by using an agitator mill with microballs, a high pressure homogeniser or intensive vibration as used in continuous disintegration devices. When a homogeniser is used the speed is conveniently from 5,000 to 10,000 rpm. The homogenisation may conveniently be carried out for a period of 5 to 90 minutes, preferably from 10 to 20 minutes, and at a temperature from ambient to 65° C., preferably 50° C. to 60° C.

The fine dispersion of the egg yolk and edible oil is centrifuged conveniently in a batch type centrifuge, preferably at a relatively low speed for instance from 1,000 to 5,000 rpm and especially from 2,000 to 4,000 rpm. The dispersion may conveniently be centrifuged for a period of from 10 minutes to an hour and optimally from 20 to 40 minutes. After centrifuging, the lower egg-yolk phase may be separated from the upper oil phase.

The amount of cholesterol in the separated fresh egg-yolk phase can be reduced further by treating it with a fresh batch of substantially cholesterol-free edible oil to form a fine dispersion which is then centrifuged to separate the egg-yolk phase from the oil-phase. If desired, further treatments may be carried out but after the third treatment only an insignificant amount of cholesterol is removed. In a further embodiment of the present invention the amount of cholesterol in a reconstituted freeze-dried egg-yolk may be reduced by freeze-drying a fine dispersion of destabilised egg-yolk and edible oil before centrifuging to separate the egg-yolk phase from the oil-phase. This may be done by reducing the pH of fresh wet egg-yolk to destabilise the emulsion, treating the emulsion with an edible oil to form a fine dispersion, freeze-drying the dispersion and then centrifuging to separate the egg-yolk phase from the oilphase. Alternatively, wet egg-yolk with a reduced cholesterol content obtained in accordance with the present invention may be treated with cholesterol-containing edible oil which has been separated from the egg-yolk phase to obtain a fine dispersion which is freeze-dried and then centrifuged to separate the egg-yolk phase from the oil phase.

The amount of cholesterol in the separated reconstituted freeze-dried egg-yolk phase can be further reduced by treating it with a fresh batch of substantially cholesterol-free edible oil to form a fine dispersion which is then centrifuged to separate the egg-yolk phase from the oil-phase.

The low cholesterol egg-yolks obtained according to the present invention may be further treated to prolong their shelflife. For example, they may be pasteurised, frozen, freezedried and therefore stored before any technical utilisation. The functional properties of low cholesterol egg-yolk are unaffected by freezing and prolonged storage at −20° C.

Freeze-dried low cholesterol yolk can easily be rehydrated giving a reconstituted low cholesterol yolk with performance and functionality comparable to fresh plain-egg-yolk.

Another feature of the present invention is the low cost of the whole process, due to a recycling of the oil and the low energy needs in the centrifugation process.

The low cholesterol egg-yolk may be used in a large variety of foodstuffs for example mayonnaises, cake batters, cream puffs, bakery goods and candies. The emulsifying performance of the acidified low cholesterol yolk are superior to unprocessed yolk.

The following Examples further illustrate the present invention in which the viscosity was measured on a Brookfield viscometer using spindle No. 2 rotating at 50 rpm.

EXAMPLE 1

2 kg egg-yolk containing 1.24% cholesterol with an initial pH 6.68 were treated with 13 ml of 16% hydrochloric acid. The pH was lowered to 5.65 and the viscosity decreased from 280 to 175 cp at 20° C. The egg-yolk was placed in a mixer (Homorex) with 8 kg peanut oil. The mixture was homogenised at 50° to 55° C. for 1 hour at 7,000 rpm. After mixing, the oil/yolk mixture was centrifuged in a batch centrifuge for 30 minutes at 3,000 rpm. Two distinct phases, an upper oilphase representing 83.5% of the initial mass and a lower yolk-phase representing 16.5% of the initial mass were collected. The amount of cholesterol was reduced to 0.25% which is a 79.84% decrease from the initial amount.

EXAMPLE 2

The peanut oil used in Example 1 was substantially freed from the cholesterol by submitting it to a fall film molecular distillation on Leybold KOL-1 at 230° C. and a pressure of $2.10^{-3}$ mm Hg.

4 kg of the distilled peanut oil were added to 1 kg of the egg-yolk treated in Example 1 which had a pH of 5.63. The mixture was homogenised at 50° to 55° C. for 1 hour at 7,000 rpm and batch centrifuged at 3,000 rpm to obtain a lower yolk-phase representing 15.2% of the initial mass. The amount of cholesterol was reduced to 0.13% which is an 89.25% decrease from the amount present in the original untreated egg-yolk.

EXAMPLE 3

A process was carried out in a similar manner to that described in Example 1 and afterwards the separated peanut oil was added back to the treated egg-yolk to reconstitute the fine dispersion. This dispersion was freeze-dried and then centrifuged. The amount of cholesterol present in the freeze-dried egg-yolk before centrifugation was 2.74% and this was reduced to 0.55% after centrifugation, which is a decrease of 79.95%.

EXAMPLE 4

A process was carried out in a similar manner to that described in Example 2 and afterwards the separated peanut oil was added back to the treated egg-yolk to reconstitute the fine dispersion. This dispersion was freeze-dried and centrifuged whereupon the amount of cholesterol was 0.29%, which is a decrease of 89.12%.

COMPARATIVE EXAMPLES A, B, C AND D

Examples A, B, C and D were carried out in a similar manner to Examples 1, 2, 3, 4 respectively except that the pH of the egg-yolk was not reduced by addition of acid. In each case the reduction in cholesterol content of the egg-yolk of the comparative example was less than that of the corresponding Example 1, 2, 3 or 4 as illustrated in the following Tables I and II.

TABLE I

| | FRESH EGG-YOLK CHOLESTEROL CONTENT 1.24% | |
|---|---|---|
| Example | Cholesterol % on egg-yolk | Decrease on cholesterol level % |
| 1 | 0.25 | 79.84 |
| A | 0.3119 | 74.85 |
| 2 | 0.1333 | 89.25 |
| B | 0.1820 | 85.32 |

TABLE II

RECONSTITUTED
FREEZE DRIED EGG-YOLK
Cholesterol Content 2.74%

| Example | Cholesterol % on egg-yolk | Decrease on cholesterol level % |
|---------|---------------------------|--------------------------------|
| 3       | 0.55                      | 79.93                          |
| C       | 0.69                      | 74.82                          |
| 4       | 0.29                      | 89.42                          |
| D       | 0.40                      | 85.40                          |

We claim:

1. A process for reducing the amount of cholesterol in egg-yolk which comprises the steps of:
   (a) reducing the pH of fresh, wet egg-yolk to destabilise the emulsion;
   (b) treating the destabilised egg-yolk emulsion with a substantially cholesterol-free edible oil to form a fine dispersion;
   (c) centrifuging the dispersion to form an egg-yolk phase and an oil phase; and
   (d) separating the egg-yolk phase having reduced cholesterol content from the oil phase.

2. A process according to claim 1, wherein the pH of the egg-yolk is reduced to a value of from 4 to 6.

3. A process according to claim 1, wherein the pH of the egg-yolk is reduced by adding mineral acid having a concentration of from 10% to 20%.

4. A process according to claim 1, wherein the destabilised emulsion is treated with from 3 to 5 times its own weight of edible oil.

5. A process according to claim 1, wherein the edible oil is an oil containing at least 75% polyunsaturated component.

6. A process according to claim 1, wherein the fine dispersion of the destabilised egg-yolk and edible oil is produced by homogenisation.

7. A process according to claim 1, wherein the fine dispersion of the egg-yolk and edible oil is centrifuged at a speed of from 2,000 to 4,000 rpm.

8. A process according to claim 1, wherein the egg-yolk phase that has been separated from the oil phase is further treated with substantially cholesterol-free edible oil to form a fine dispersion, the dispersion is centrifuged to form the egg-yolk phase and the oil phase, and the egg-yolk phase is then separated from the oil phase.

9. A process according to claim 1, wherein the fine dispersion of the destabilised egg-yolk and edible oil is freeze-dried before being centrifuged to form the egg-yolk phase and the oil phase which are then separated from each other.

10. A process according to claim 1, wherein the separated egg-yolk and oil are recombined and treated to form a fine dispersion, freeze-dried and again centrifuged to form the egg-yolk phase and the oil phase which are then separated from each other.

11. A process according to claim 9 or claim 10 wherein the egg-yolk phase that has been separated from the oil-phase is further treated with substantially cholesterol-free edible oil to form a fine dispersion, the dispersion is centrifuged to form the egg-yolk phase and the oil phase, and the egg-yolk phase is then separated from the oil phase.

12. A process according to claim 1, wherein the edible oil that has been separated from the egg-yolk is treated to remove cholesterol and reused to reduce the amount of cholesterol in egg-yolk.

13. A process for reducing the amount of cholesterol in egg-yolk without the employment of organic solvents which comprises the steps of:
   (a) reducing the pH of fresh, wet egg-yolk to destabilise the emulsion;
   (b) treating the destabilised egg-yolk emulsion with a substantially cholesterol-free edible oil to form a fine dispersion;
   (c) centrifuging the dispersion to form an egg-yolk phase and an oil phase; and
   (d) separating the egg-yolk phase having reduced cholesterol content from the oil phase.

* * * * *